A. J. WALKER.
METAL TIRE SHIELD.
APPLICATION FILED JULY 28, 1909.
953,873.
Patented Apr. 5, 1910.
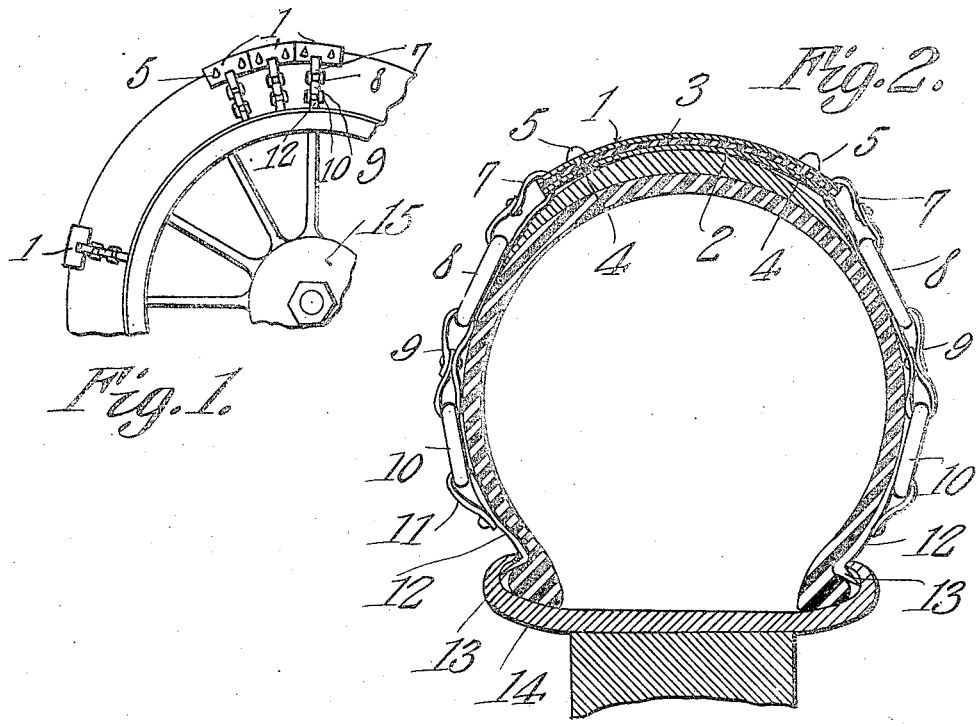
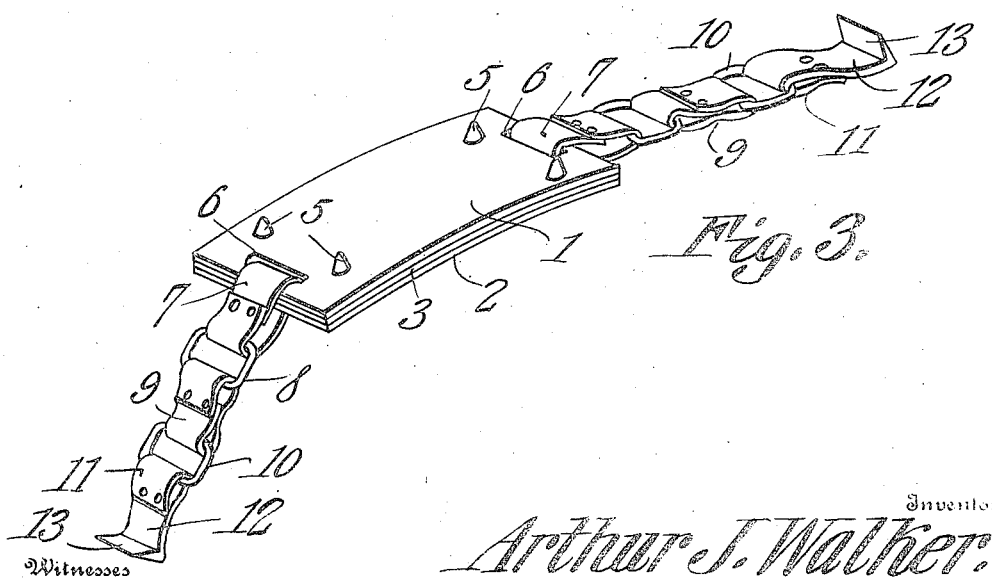

UNITED STATES PATENT OFFICE.

ARTHUR J. WALKER, OF HOOKER, OKLAHOMA.

METAL TIRE-SHIELD.

953,873.  Specification of Letters Patent.  Patented Apr. 5, 1910.

Application filed July 28, 1909. Serial No. 510,040.

*To all whom it may concern:*

Be it known that I, ARTHUR J. WALKER, a citizen of the United States, residing at Hooker, in the county of Texas and State of Oklahoma, have invented a new and useful Metal Tire-Shield, of which the following is a specification.

This invention relates to tire shields and its object is to provide a device of this character which is simple and durable in construction and which is made up of a number of separate similar sections which can be separately applied to or removed from the tire.

Another object is to provide a shield section having an imperforate intermediate or tread portion having a cushion combined therewith.

Another object is to provide a tire shield the cushioned tread portion of which is provided with anti-skidding devices constituting portions of means utilized for fastening together parts of said tread portion.

With these and other objects in view, the invention consists in certain novel details of construction and combinations of parts hereinafter more fully described and pointed out in the claim.

In the accompanying drawings the preferred form of the invention has been shown.

In said drawings:—Figure 1 is a side elevation of a portion of a wheel having applied thereto some of the shield sections constituting the present invention. Fig. 2 is an enlarged transverse section through a portion of a tire and showing one of the shield sections thereon, the tread portion of the shield being in section. Fig. 3 is a perspective view of one of the shield sections detached.

Referring to the figures by characters of reference, 1 and 2 designate the inner and outer plates of the tread portion of the shield section, both of the plates being bowed longitudinally and having interposed between them a cushioning strip 3 formed preferably of rubber or other sufficiently elastic material, the plates and cushion being held together by rivets 4 or the like. These rivets are preferably located adjacent the corners of the plates and the outer ends thereof are provided with substantially conical heads 5, constituting anti-skidding devices. The outer and inner plates 1 and 2 are preferably formed of spring steel or other material which will not be perforated as a result of ordinary use. Transversely extending slots 6 are formed in the end portions of the plates 1 and 2 and of the cushioning strip 3 and each of these slots receives a link 7 preferably formed of a flat metal strip having its ends lapping and riveted together. Said link 7 is connected by means of a link 8 formed of heavy wire or the like with an intermediate link 9 made of a flat metal strip having its ends lapping and riveted together and also to the opposed portion of the link, thus forming spaced eyes in one of which the link 8 is mounted while the other eye has a link 10 disposed therein. This last mentioned link is similar to the link 8 and is loosely mounted within an eye 11 formed by one end of a flat metal strip 12. A hook 13 extends from the free end of the strip 12. It is to be understood that a large number of these shield sections can be used, it being preferable to so mount them upon the tire as to contact at their treads and thus prevent the tire from becoming punctured. If preferred however, the sections can be spaced apart at desired intervals so as to merely constitute means for preventing skidding and circumferential slipping of the wheel.

Various changes can of course be made in the construction and arrangement of the parts without departure from the spirit or sacrificing the advantages of the invention.

What is claimed is:—

A tire shield composed of sections, each section consisting of spaced metallic plates, a cushioning strip interposed there-between, said plates and strip having registering slots, a link arranged within each set of registering slots, said link consisting of a flat metal strip having lapping ends, and means for securing the ends together, a chain extending from each of said links, alternate links of the chain being made up of flat strips of metal having lapping ends secured together, and a hooked rim engaging member formed of a flat metal strip having a looped end engaging one of the links of each chain and said looped portion being secured against opening.

In testimony that I claim the foregoing as my own, I have hereto affixed my signature in the presence of two witnesses.

ARTHUR J. WALKER.

Witnesses:
CHAS. WALKER,
HARRY MANNING.